UNITED STATES PATENT OFFICE.

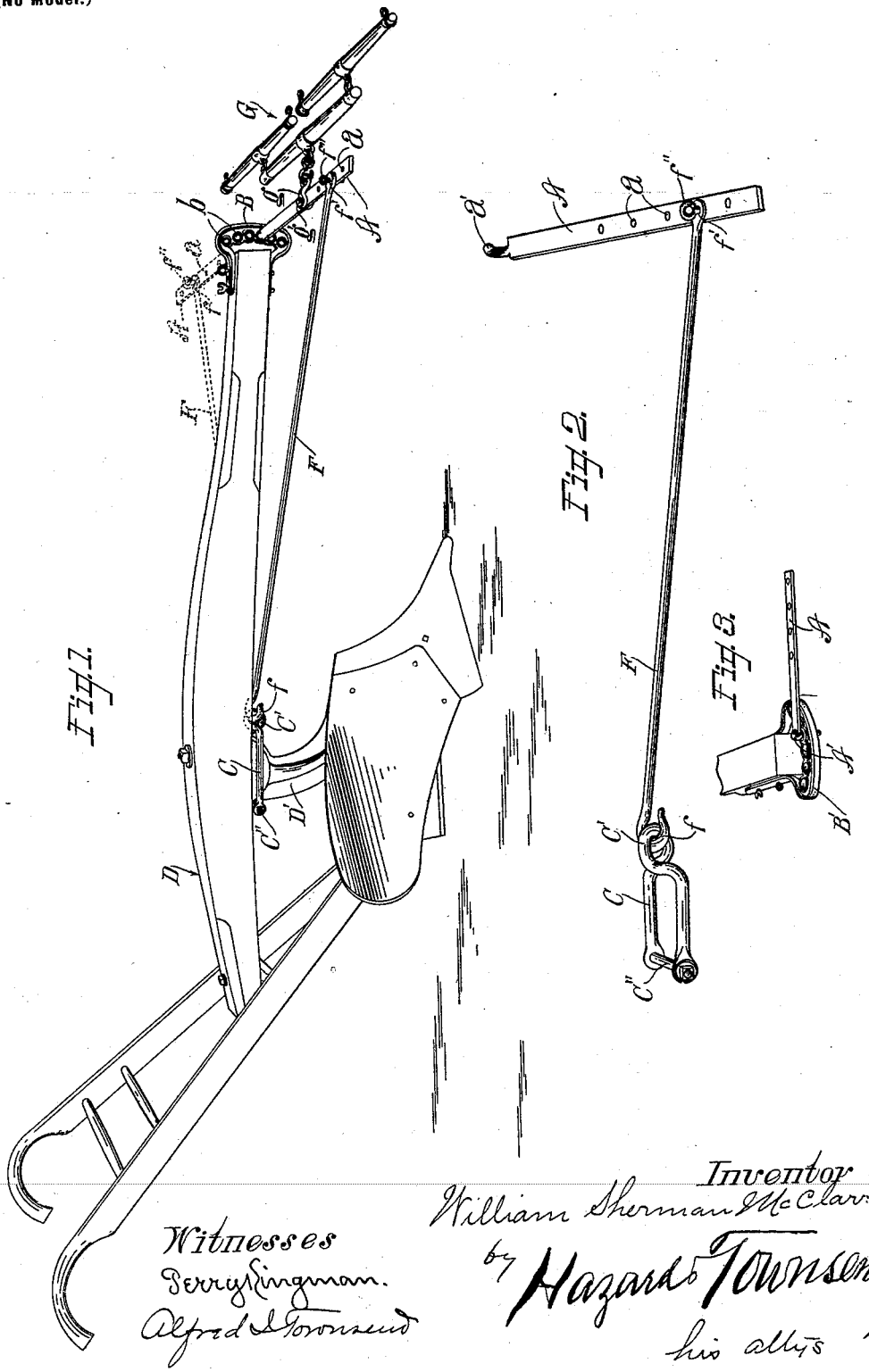

WILLIAM S. McCLARREN, OF REDLANDS, CALIFORNIA.

DRAFT APPLIANCE FOR PLOWS.

SPECIFICATION forming part of Letters Patent No. 622,818, dated April 11, 1899.

Application filed March 10, 1897. Serial No. 626,839. (No model.)

*To all whom it may concern:*

Be it known that I, WILLIAM SHERMAN MC-CLARREN, a citizen of the United States, residing at Redlands, in the county of San Bernardino and State of California, have invented a new and useful Draft Appliance for Plows, of which the following is a specification.

My invention relates particularly to those devices which are designed for the purpose of causing a plow to travel close to the trunk of a fruit-tree and beneath the limbs thereof while the horse or horses travel at one side thereof.

The particular object of my invention is to produce a device of this kind which will be of the utmost simplicity, which will be capable of being readily attached and detached to plows of ordinary construction, and which will be so arranged that the spreader-bar will be normally held in an elevated position and yet will be free to move when the plow is tipped toward the furrow, so as to allow the plow to be readily thrown out of the soil.

My invention comprises the various features of construction and combinations of parts, whereby I am enabled to produce a device which may at slight expense be quickly attached to any ordinary plow and will enable the orchardist to plow close to the trunk of fruit-trees without that danger of breaking the limbs and bruising the trunk by reason of the horse or horses crowding or brushing against them, which always occurs with a plow unprovided with my attachment, in an effort to cause the plow to travel close to the tree.

The accompanying drawings illustrate my invention.

Figure 1 is a perspective side elevation of a plow provided with my improved draft appliance and having a pair of doubletrees attached thereto. Fig. 2 is a perspective side elevation of my draft appliance removed from the plow. Fig. 3 shows my invention adapted for use with plows having horizontal clevises.

In the drawings, A represents the spreader-bar of my appliance, which is provided along its length with a series of clevis-pin holes $a$ and has at one end a hook $a'$, which is adapted to hook into the pin-holes $b$ of the plow-clevis B. This plow-clevis is of the ordinary vertical type, having the clevis-pin holes passing horizontally therethrough.

C is a clamp-clevis formed of a single piece of metal twisted at its closed end to form an eye $C'$. This clevis is adapted to fit the standard $D'$ of the plow D, and a bolt $C''$ is arranged to clamp the clevis firmly upon the standard and to hold it snugly against the under side of the plow-beam, as shown in Fig. 1. By making the eye $C'$ integral with the clevis a sufficient degree of spring is thereby given to the clevis-arms to allow adjustment thereof to clamp upon standards of different sizes.

F is a draft-rod which is provided at one end with a hook $f$, adapted to hook into the eye $C'$ of the clevis and to thereby attach the rod to the plow-standard. The other end of the rod is arranged by any suitable means, such as the pin-hole $f'$ and bolt $f''$, to be secured to the spreader-bar. The bolt passes through one of the clevis-holes $a$.

G represents the doubletrees, to which the horses are attached. The clevis $g$ of the doubletree is secured to the spreader-bar by means of the clevis-pin $g'$, passing through one of the pin-openings $a$.

In practice to apply my device to a plow the clamp-clevis C is placed encircling the standard of the plow and is firmly clamped thereupon by means of the bolt $C''$. Then the spreader-bar A is secured to the front end of the plow-beam by passing the hook $a'$ through one of the clevis-holes in the plow-clevis. The draft-rod F is attached to the standard of the plow by hooking the hook $f$ into the eye $C'$, and its other end is secured to the spreader-bar by means of the bolt $f''$. The doubletrees are then secured to the spreader-bar by passing the clevis-pin $g'$ through one of the pin-holes $a$, and the device is ready for use. When the plow is drawn forward by the horses, the line of draft is thrown to one side of the plow-beam, and the plow is thus carried to one side or the other, according to which side of the beam the device is arranged upon. In dotted lines in Fig. 1 the device is shown arranged upon the left-hand side of the plow-beam, while in solid lines in the same figure it is shown arranged upon the right-hand side. The shifting from one side to the other can be quickly done by simply detaching the draft-rod and the doubletree-clevis from the spreader-bar, removing the draft-bar hook from the plow-clevis, and inserting the hook from the other side of the clevis, after which the draft-rod and the whiffletree-clevis may be attached to the spreader-bar, and the device is ready for use.

By my improved construction the draft is all placed upon the standard of the plow and there is no side leverage upon the plow-beam tending to bend or break it. By shifting the clevis-pin $g'$ into the various holes $a$ the furrow may be thrown the desired distance to one side of the line of draft. By having the hook $a'$ project upwardly a considerable latitude of horizontal movement is allowed to the spreader-bar; but when the plow is turned upon its side the hook will engage with the clevis and will prevent the spreader-bar from dragging upon the ground. Furthermore, it is practically impossible for the spreader-bar to become disengaged from the plow-clevis.

In Fig. 3 I have shown the spreader-bar A provided with an eyebolt A', whereby the bar is adapted to a plow having a horizontally-arranged clevis B'. It is to be understood that this bolt may be loosely connected with the bar or made integral therewith, as may be deemed preferable by the user, without avoiding my claim.

Now, having described my invention, what I claim as new, and desire to secure by Letters Patent, is—

1. A draft appliance for plows comprising a spreader-bar provided with holes for a clevis-pin, and provided at one end with a hook adapted to hook into the pin-holes of a plow-clevis; a draft-rod adapted at one end to be attached to the standard of a plow and at its other end to be secured to the draft-bar.

2. A draft appliance for plows comprising a draft-bar provided with a series of holes for a clevis-pin and having at one end an upwardly-projecting hook to hook into the pin-holes of a plow-clevis; a clamp-clevis adapted to fit upon the standard of a plow; a bolt arranged to clamp the clevis upon the standard of a plow; and a draft-rod adapted at one end to be secured to the clamp-clevis, and at its other end to be attached to the draft-bar.

3. In a draft appliance for plows, the spreader-bar set forth provided with clevis-pin holes, and having at one end an upwardly-projecting hook adapted to hook into the pin-holes of a plow-clevis; and a draft-rod connecting the outer end of the spreader-bar with the plow-beam.

WILLIAM S. McCLARREN.

Witnesses:
B. P. DUGAN,
CHAS. E. TRUESDELL.